J. E. HANZLIK.
CERTIFICATE OF DEPOSIT.
APPLICATION FILED OCT. 17, 1912.

1,286,303.

Patented Dec. 3, 1918.
4 SHEETS—SHEET 1.

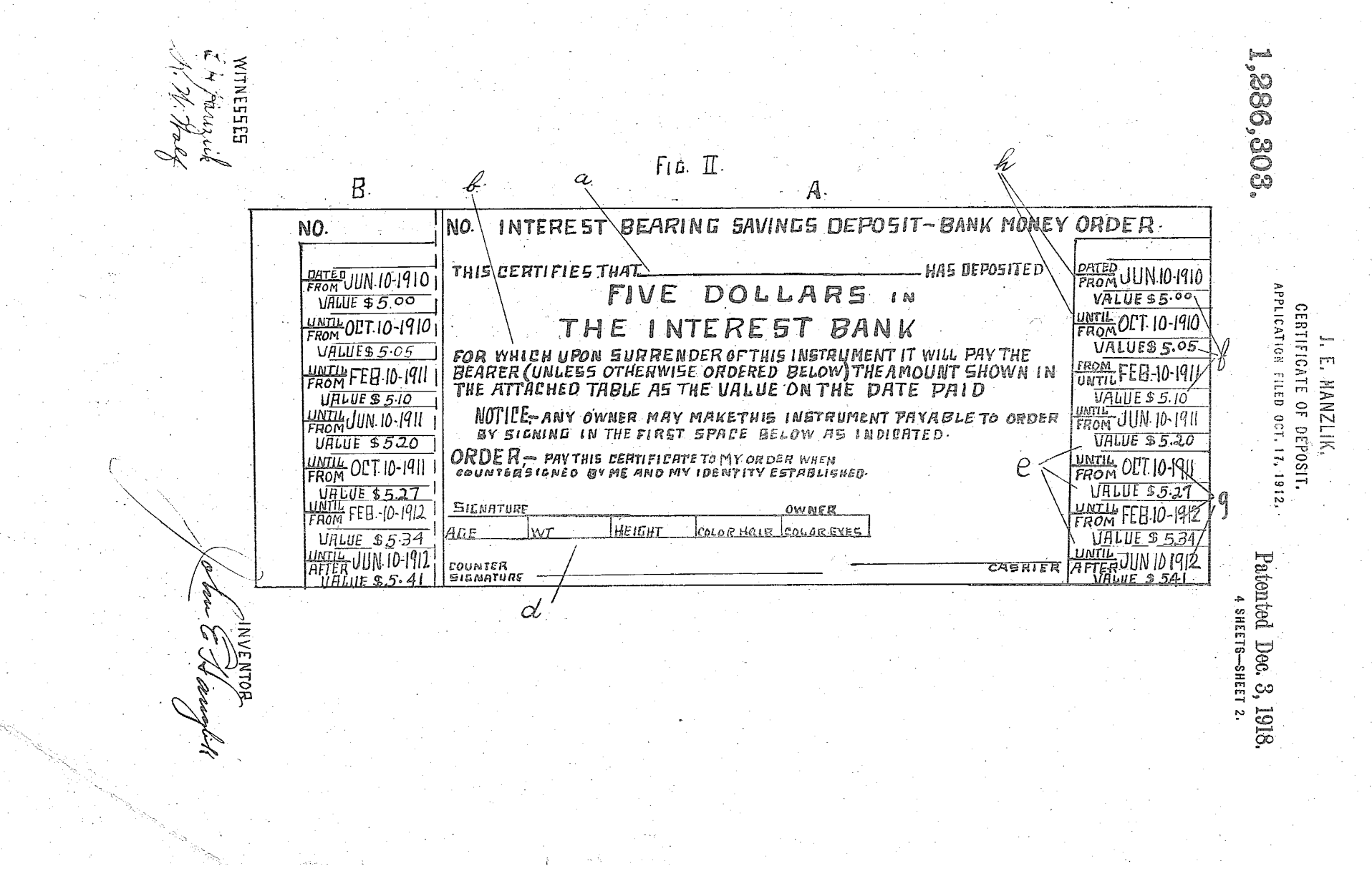

J. E. MANZLIK.
CERTIFICATE OF DEPOSIT.
APPLICATION FILED OCT. 17, 1912.

1,286,303.

Patented Dec. 3, 1918.
4 SHEETS—SHEET 2.

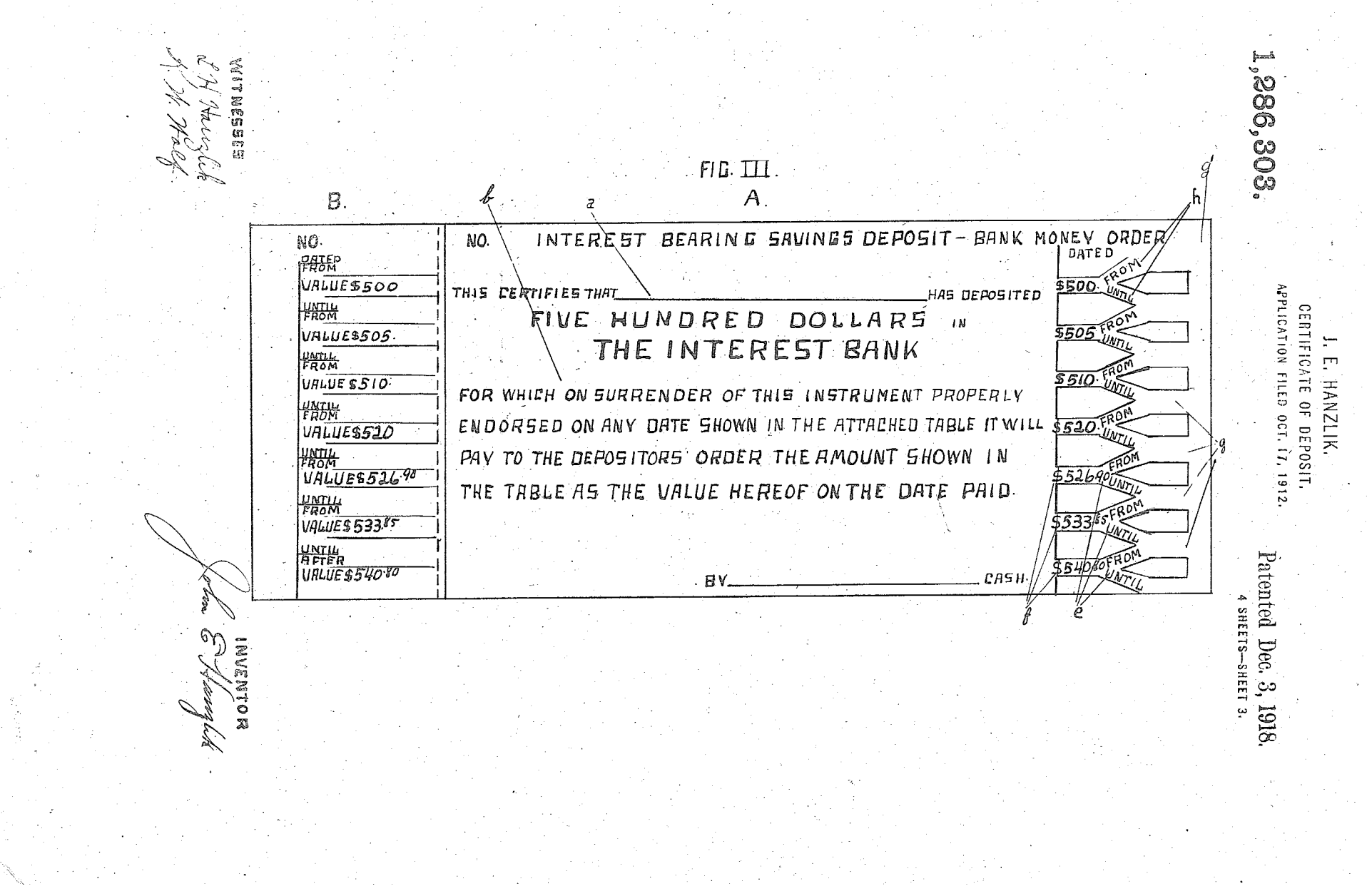

J. E. HANZLIK.
CERTIFICATE OF DEPOSIT.
APPLICATION FILED OCT. 17, 1912.

1,286,303.

Patented Dec. 3, 1918.
4 SHEETS—SHEET 3.

J. E. HANZLIK.
CERTIFICATE OF DEPOSIT.
APPLICATION FILED OCT. 17, 1912.

1,286,303.

Patented Dec. 3, 1918.
4 SHEETS—SHEET 4.

INTEREST BEARING DEPOSIT

NO. _____

THIS CERTIFIES _____ HAS DEPOSITED IN

FIVE HUNDRED DOLLARS

THE INTEREST BANK

FOR WHICH ON SURRENDER OF THIS INSTRUMENT PROPERLY ENDORSED ON ANY DATE SHOWN IN THE ATTACHED TABLE IT WILL PAY TO THE DEPOSITOR'S ORDER THE AMOUNT SHOWN IN THE TABLE AS THE VALUE HEREOF ON THE DATE PAID.

_____ CASH.

BY _____

WITNESSES
E. H. Hanzlik
K. W. Wolf

INVENTOR
John E. Hanzlik

UNITED STATES PATENT OFFICE.

JOHN EDW. HANZLIK, OF MADISON, WISCONSIN.

CERTIFICATE OF DEPOSIT.

1,286,303. Specification of Letters Patent. Patented Dec. 3, 1918.

Application filed October 17, 1912. Serial No. 726,297.

*To all whom it may concern:*

Be it known that I, JOHN EDWARD HANZLIK, a citizen of the United States, residing at Madison, county of Dane, State of Wisconsin, have invented a new and useful Certificate of Deposit, of which the following is a specification.

My invention relates to certificates of deposit.

The principal object of my invention is to provide an instrument of this character comprising a promise of the bank to pay one of a plurality of predetermined, fixed amounts in lieu of a principal deposit with interest thereon at a specified rate, the said instrument embodying the several fixed amounts, date indicia, blank spaces, and connecting figures in such relationship that the date and amount indicia will reciprocally index each other so that the proper fixed amount payable on any date during the term for which the instrument is issued can be seen at a glance and without computing either time or interest.

A further object of the invention is to provide an instrument of this character that as issued is payable to the bearer, but embodying structural and other means by which any owner of the instrument may at any time and anywhere convert it into an instrument payable to order and negotiable by indorsement only thereafter.

Other objects of the invention will be disclosed in the following description, illustrated in the drawings and pointed out in the appended claims.

In the accompanying drawings illustrating my invention,

Figure 1 illustrates an instrument embodying my invention.

Fig. 2 illustrates an instrument embodying my invention, illustrating how the arrangement of amount and date indicia may be varied to suit the particular needs of any community.

Fig. 3 illustrates a slightly modified form of instrument embodying my invention and Fig. 4 illustrates a form of instrument wherein the month day indicia is made a permanent part of the instrument by being embodied in the printed form.

I propose to manufacture the instruments of my invention in principal even amounts of $5.00, $20.00, $500.00 as illustrated in the drawings (1, 2, 3 and 4) and such other amounts as may be feasible. In the drawings, A is the instrument, and B is a detachably connected stub. It is intended that the stub shall contain a duplicate of the value and date indicia embodied in the instrument and such other data as the bank may desire to retain. When the certificate is issued the stub is detached and retained by the bank for reference.

The instrument will comprise an acknowledgment of the deposit of the principal sum, a suitable space to receive the name of the depositor, an agreement of the depositary to pay, preferably to the bearer of the instrument, the proper one of the plurality of amounts embodied thereon that represents the value of the instrument on the date on which it is presented for payment.

When making the certificates the term for which they are intended to run will be divided into a plurality of regular or irregular intervals, preferably quarterly intervals or other intervals of one or more even months, and fixed amounts will be determined upon as the values for the instrument during each of the intervals of the term. These amounts will be arranged preferably in a column at one end of the instrument alternately with associated blank date spaces. When the instrument is issued the first blank date space at the top will receive the date of the instrument and the next space will receive the date representing the end of the first interval and beginning the second interval. The remaining date spaces will likewise each receive the appropriate date representing the end of one interval and the beginning of the next interval. Parallel with the column of value indicia and date spaces I arrange a plurality of figures, such for instance, as braces, each comprising three portions, to wit: a portion to be associated with one of the value indicia, a portion to be associated with the date beginning the interval during which the value indicia last referred to represents the value of the instrument and a portion to be associated with the date ending the interval. These figures will be arranged in a column so that the portion of one figure that represents the ending date of an interval will be contiguous to the portion of the following figure that represents the beginning date of the next interval, and so that these contiguous portions will equally index the associated date or date space and will be reciprocally indexed thereby. Thus each date after the first will index the value indicia of the interval it ends and the value indicia of the interval it begins. Each value indicia except the last, will index the beginning and ending dates of the interval for which it represents the value of the instrument.

The instrument will preferably contain a statement to the effect that any owner may at his option change the terms of the instrument in respect to its being payable to bearer and cause the instrument to become negotiable by indorsement only, by signing an order embodied in the certificate to that effect, a suitable space to receive the signature of the person who may wish thus to change it, blank spaces to receive data personally descriptive of the person who signs the order to aid in identifying the signer when he desires to cash or further negotiate it, and directions for signing the order and inserting the identification data.

It is proposed to manufacture these instruments in suitable principal amounts with blank data spaces and to furnish them to the banks in this form together with a reciprocal multiple date holding stamp constructed so that when superimposed upon the instrument the several date holders of the stamp will exactly fit the several blank date spaces in the certificate and at one impression of the stamp insert therein the appropriate beginning and ending dates of the several intervals of the term. It is intended that these certificates will be preferably issued and sold by the bank in considerable numbers to employers who will transfer them by delivery to employees in lieu of cash in payrolls. The employees can in turn negotiate or cash them at banks, stores and other places by delivery, but because of the simple arrangement of date and amount indicia workmen, including foreigners and others unable to read the language or understand or compute interest, will immediately understand that the certificate is increasing in value and precisely how much will be paid at any desired future date. Thus the instruments save the workmens' time, absorb the savings and new capital created by employees promptly before it is otherwise dissipated and effectively transfers the money of a community to the banks. It is intended that as soon as a certificate has reached a person who can hold it more or less permanently for its increased value he will convert it into an instrument payable to order by inserting his signature in the space provided therefor in the certificate and filling in the identification spaces with data personally descriptive of his personal and physical characteristics.

Referring more particularly to the drawings, A, (Fig. 1) represents the body of the instrument which comprises an acknowledgment of the deposit of the principal sum with a blank space as shown at $a$ in which to insert the name of the depositor, the value indicia representing the amounts payable during each of the intervals of the term arranged progressively in a column $f$, the blank spaces to receive the date of the instrument and the several succeeding dates that limit the several intervals of the term at $g$, and arranged in a column parallel thereto the interval figures $e$. In Figs. 1 and 2 the column of interval figures $e$ is placed at the left of the date spaces and value indicia which alternate in one column. In Fig. 3 the same relationship or association is established with the value indicia and date spaces in separate columns. In the several drawings the interval figures are each comprised of three parts, as follows: a part associated with the value indicia, and a part associated with the date space or date for the beginning of the related interval marked "from", and a part associated with the date space or date for the end of the interval and marked "until". The "from" portion of each figure is placed contiguous to the "until" portion of the preceding figure so that both portions articulate with the middle of the date space in such a manner that the space would be bisected by a line extending forward so that the said space is indexed equally by each of the interval figures and reciprocally indexes equally each of the said figures, so that when a date is inserted in such space it is indexed as the ending date of one interval by the "until" portion of the figure and as the beginning date of the succeeding interval by the "from" portion of its figure. Also each value indicia is thereby equally associated with two dates, the date representing the beginning of the interval for which said value indicia represents the value of the instrument and associated with the "from" portion of the intervals' figure, and the date representing the end of the interval and associated with the "until" portion of the figure. Thus each date after the first by means of its relative position and its association with the "from" and "until" portions of the interval figures indexes with equal certainty two of the value indicia, and reciprocally each value indicia except the last indexes with equal certainty two dates. Thus in looking at any date one is instantly referred to two of the value indicia, the one for the interval ended by it and the one for the interval begun by it. In looking at any value indicia one is instantly referred to two dates, the one beginning the interval for which it represents the value of the instrument and the one ending the interval.

The instrument also embodies a statement $b$ to the effect that the bank will pay the bearer the proper amount shown to be payable on the date of presentation, together with a notice that any owner may change the terms of the instrument as to its being payable to bearer and make it payable to order thereafter by signing an order embodied thereon to that effect, together with a printed order form, a space to receive the signature of the owner wishing to make the order effective, and spaces to contain data descriptive of physical or other characteristics of the person that signs the order $d$ to aid in identifying him when he desires to cash or negotiate the instrument.

Fig. 2 illustrates an instrument in the amount of $5.00 after having had impressed thereon in the several date spaces the appropriate dates to indicate the date of the instrument and the division of the term into suitable intervals. The first space in $g$ contains the date June 10, 1910 which performs the double function of giving the date to the instrument and fixing the beginning date of the first interval. The second $g$ space has received the date Oct. 10, 1910 which terminates the first interval and marks the beginning of the second interval. The value indicia associated with the first interval figure is $5.00 and is equally associated with the beginning and ending dates of the interval by position and the "from" and "until" portions of the interval figure respectively. Thus $5.00 is the value of the instrument during this interval, which is four months. The third space $g$ has received the date Feb. 10, 1911 making the second interval four months. The associated value indicia is $5.05 which amount is the value of the instrument any time during the second interval. This amount indicia indexes or indicates the beginning and ending dates of the interval. The fourth date space has received the date June 10th, 1911 making the third interval four months and the value indicia associated with that interval is $5.10. In this drawing the intervals are represented of equal length but it is obvious that the intervals may be of irregular length. To show the elasticity of the instrument and one of its valuable features the fourth value indicia representing the value of the instrument at the end of the first three intervals and during the fourth interval is $5.20 making the compensation to the holder during the third interval of four months as great as the compensation for holding it through the entire first two intervals of four months each. This feature of the instrument enables the bank to adjust the compensation for deposited money on a basis more equitably adjusted to the demand and supply of money as effected by seasonal and other causes in any given community. Thus if the bank determines that the supply and demand for money in a community during the months of July, August and September entitles depositors to a high rate of interest these instruments permit the adjustment in either of two ways, by having the instruments printed with suitable value indicia to effect the result or by changing the length of the interval. The use of these certificates generally in any community properly adjusted to the local variations in the supply and demand for money will result in maintaining bank deposits and thereby lessen disturbance of loans and commercial activities during such periods.

Fig. 3 represents an instrument in the amount of $500.00 made payable to order and omitting the order and signature spaces shown at $d$ in Figs. 1 and 2. The columns of value indicia $f$ and date spaces $g$ are shown in this figure as occupying parallel positions instead of alternating in the same column. In this figure a space $g'$ is provided for the year dates in such relative position to the month and day indicia as to make repetition of the year indicia unnecessary.

Fig. 4 illustrates a form of the instrument in which the month day indicia are made a permanent part of the instrument by being embodied in the printed form as shown at $g$, the numerals 1 to 30 inclusive the proper one of which will be selectively indicated by a punch or other means of identification at the time the instrument is dated and issued.

Having now described my invention and illustrated the same by means of the accompanying drawings, what I claim as new and desire to secure by Letters Patent is:

1. An instrument of obligation chronologically of progressively increasing value payable on one or more dates during each of a plurality of consecutive intervals during a term, involving value indicia, each representing one of the several progressively increasing values, and each representing the value of the instrument during one of the chronological intervals, and provided with a date space structurally positioned in association with each of said value indicia, said date spaces being adapted to contain date legends and being so positioned with relation to said value indicia that each date space after the first will index or point out two consecutive value indicia and each of the value indicia, except the last, will point out or index two successively positioned date spaces.

2. In an instrument of the class described, the combination of a certificate of obligation embodying value indicia representing progressively increasing fixed amounts of principal and interest payable during consecutive intervals and provided with date spaces associated with the value indicia and so positioned relative to the value indicia that all of the date spaces but one index two of the value indicia and that all of the value indicia but one index two of the date spaces.

3. An instrument of obligation chronologically of progressively increasing value payable on one or more dates during each of a plurality of consecutive intervals during a term, embodying value indicia representing progressively increasing amounts of money, each of the value indicia representing the value of the instrument during one of the said intervals, and provided with spaces for the reception of written or printed dates structurally associated with each of the said value indicia, said spaces being so positioned with relation to the said value indicia that each date space after the first will signify two consecutive value indicia and each of the said value indicia except the last will signify two successive date spaces.

4. An interest bearing certificate of obligation payable on one or more dates during each of a plurality of consecutive intervals during a term, embodying value indicia representing progressively increasing amounts of principal and interest, and each representing the value of the instrument during one of the intervals, and provided with spaces for the reception of written or printed dates structurally arranged in definitely fixed relation to each of the said value indicia, said date spaces being so positioned with relation to the said value indicia that each date space after the first will index or point out two consecutive value indicia and each of the said value indicia except the last will index or point out two successive date spaces, the date spaces being arranged in such order that prescribed successive date indicia may be made therein by one impression of a multiple dating stamp or press.

5. In an instrument of the class described, the combination of a certificate of obligation embodying value indicia representing progressively increasing fixed amounts of principal and interest payable during consecutive intervals, date indicia associated with the value indicia and a plurality of figures each comprising a portion associated with one of the value indicia, a portion associated with the date indicia marking the beginning of the interval during which said last mentioned value indicia represents the value of the instrument, and a portion associated with the date indicia marking the end of said interval.

In witness whereof I have hereunto subscribed my name in the presence of two witnesses.

JOHN EDW. HANZLIK.

Witnesses:
L. H. HANZLIK,
L. E. BOOCK.